Figure 1:
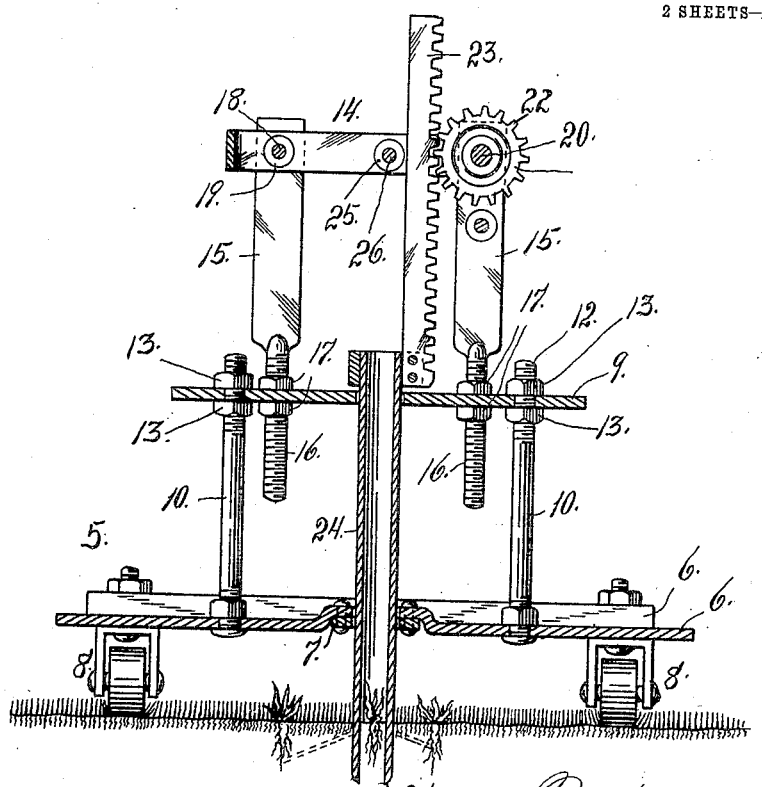

J. PRISK.
EARTH HOLE FORMING MACHINE FOR WEED EXTERMINATING PURPOSES.
APPLICATION FILED FEB. 9, 1909.

971,791.

Patented Oct. 4, 1910.

2 SHEETS—SHEET 1.

Witnesses
Inventor
John Prisk.
Attorney

J. PRISK.
EARTH HOLE FORMING MACHINE FOR WEED EXTERMINATING PURPOSES.
APPLICATION FILED FEB. 9, 1909.
971,791.
Patented Oct. 4, 1910.
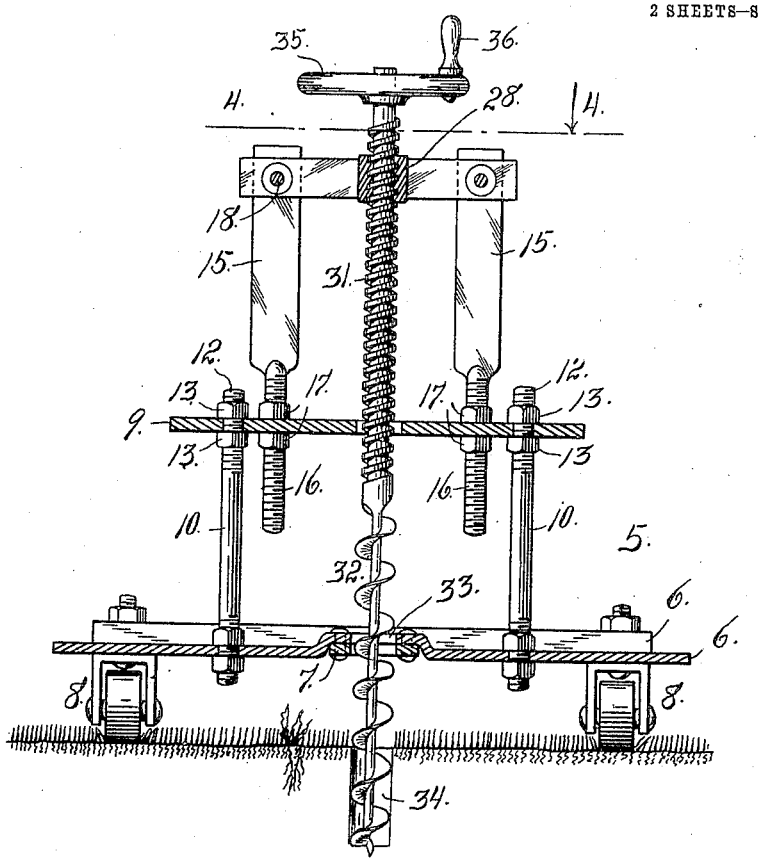
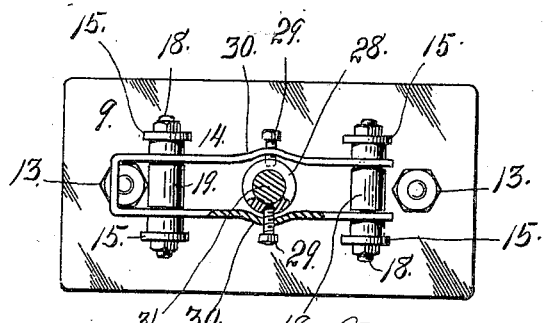

UNITED STATES PATENT OFFICE.

JOHN PRISK, OF DENVER, COLORADO.

EARTH-HOLE-FORMING MACHINE FOR WEED-EXTERMINATING PURPOSES.

971,791. Specification of Letters Patent. Patented Oct. 4, 1910.

Application filed February 9, 1909. Serial No. 476,921.

*To all whom it may concern:*

Be it known that I, JOHN PRISK, a citizen of the United States, residing in the city and county of Denver and State of Colorado, have invented certain new and useful Improvements in Earth-Hole-Forming Machines for Weed-Exterminating Purposes; and I do declare the following to be a full, clear, and exact description of the invention, such as will enable others skilled in the art to which it appertains to make and use the same, referencee being had to the accompanying drawings, and to the letters and figures of reference marked thereon, which form a part of this specification.

My invention relates to improvements in machines for making earth holes, preparatory to the extermination of dandelions and other noxious weeds by the introduction of an exterminating liquid which is brought in contact with the roots of the weeds, which extend below the grass roots of lawns or other localities where work of this kind is required.

It is well known that dandelions and most other noxious weeds and plants are deep-rooted. In other words, their roots extend, as a rule, far below the roots of the grass in which the weeds are found. It, therefore, becomes necessary, in order to exterminate the weeds without injuring the grass, to introduce the exterminating liquid a sufficient distance below the surface of the earth to escape the grass roots and at the same time come in contact with the roots of the weeds for the purpose of exterminating the latter.

My object is to provide a machine which shall greatly facilitate the formation of holes in the earth for the aforesaid purpose, and to this end, I mount upon a suitable frame a vertically disposed earth-hole-forming device, which may be moved downwardly into the earth the desired distance. It is preferred to mount the machine upon wheels, whereby it may be readily moved about. The holes must be formed at such intervals as will make it practicable to introduce the liquid half of the distance from one hole to the other where it is desired to kill weeds extending over the entire surface of the lawn or other locality.

In one form of my construction I employ a tube which is forced downwardly into the earth through the agency of a rack and pinion, the rack being connected with the tube and the pinion mounted on a shaft equipped with a hand-crank for the purpose. Another form of my improved machine consists of an auger whose upper portion consists of a threaded stem engaging a nut mounted upon the frame. In case the earth is too hard to be penetrated by the tube, the latter may be removed and the auger substituted therefor.

Having briefly outlined my improved construction, I will proceed to describe the same in detail, reference being made to the accompanying drawing, in which is illustrated an embodiment thereof.

Figure 2:
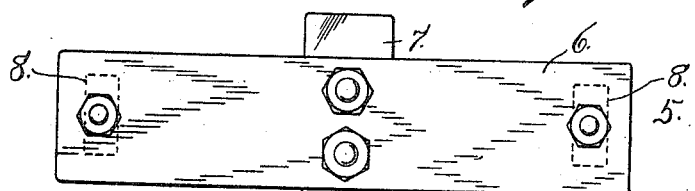
Figure 2:
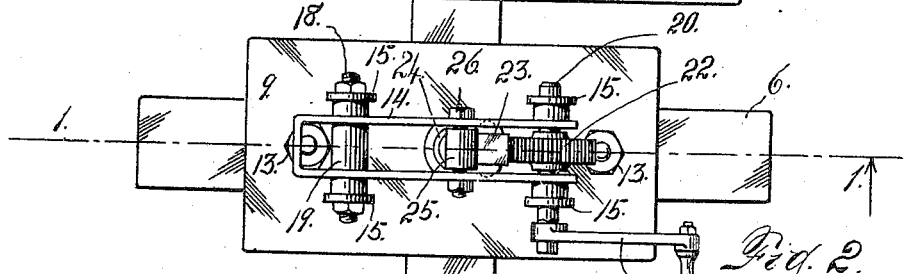

In this drawing Figure 1 is a vertical section taken through my improved machine, the parts being shown in elevation. This is a section taken on the line 1—1, Fig. 2. Fig. 2 is a top plan view of the same. Fig. 3 is a view similar to Fig. 1, but illustrating another form of construction. Fig. 4 is a top plan view of the upper portion of the machine shown in Fig. 3. This is a horizontal section taken on the line 4—4, Fig. 3, looking downwardly, the base of the machine, however, being omitted.

The same reference characters indicate the same parts in all the views.

Referring first to Figs. 1 and 2, let the numeral 5 designate a platform composed of a number of members 6 connected by a centrally located cross-member 7. This platform is mounted upon small wheels or casters 8. The centrally located platform member 6 is connected with an upper plate 9 by means of vertically disposed rods 10. The lower extremities of these rods are connected with the platform, while their upper extremities are threaded, as shown at 12, and secured to the plate 9 by nuts 13 applied to the rod both above and below the said plate, thus making the plate vertically adjustable upon the rods.

Mounted above the plate 9 is a U-shaped frame or yoke 14, which is connected with the plate 9 by means of vertically disposed bars 15, whose lower extremities consist of threaded stems 16, passing through unthreaded openings formed in the plate 9. These stems 16 are connected with the plate 9 by nuts 17 applied to the stems and engaging the plate on its upper and lower surfaces. The upper extremities of two of the bars 15 engage a horizontally disposed bolt 18, which passes through the U-shaped frame 14 and a spacing sleeve 19 interposed between the parallel members of the said frame. The other bars 15 engage an operating shaft 20, which is provided with a hand-crank 21 at one extremity. Upon this shaft 20 is mounted and made fast a gear or pinion 22, which is located between the two members of the U-shaped frame, and engages the cogs or teeth of a vertically disposed rack-bar 23, whose lower extremity is connected with the upper end of a tube 24, which passes through openings formed in the plate 9 and the platform members 6 and 7, where the last two named members intersect. A roller 25 is mounted upon a bolt 26 passed through the two members of the U-shaped frame. This roller engages the rack-bar 23 on the edge opposite its cogs. The function of this roller is to hold the rack-bar in operative engagement with the operating pinion.

The tube 24 has its lower extremity sharpened, as shown at 27, to cause it to enter the earth readily.

When this form of the machine is in operation, the user turns the crank-shaft 20 in such a direction as to move the rack-bar and the tube 24 downwardly, the latter being forced into the earth to the necessary depth. The tube is then raised, carrying the earth with it, and leaving a hole of the necessary depth. The machine is then moved a short distance and another hole formed in the same manner. In case the ground is so hard that it is difficult to force the tube 24 downwardly thereinto, the rack and pinion, together with the tube 24, are removed, and a nut 28 applied to the U-shaped frame (see Fig. 3) where the roller 25 was originally located. This nut may be held in place by screws 29. It is preferred to bend the U-shaped frame slightly outwardly on opposite sides, as shown at 30, for this purpose (see Fig. 4). A screw-stem 31 is then threaded into the nut, the said stem carrying an auger 32, which, as shown in the drawing, is formed integral with the lower extremity of the stem. This auger passes through an openig 33 formed in the platform, and is of sufficient length to penetrate the earth to form a hole 34. To the upper extremity is applied a hand-wheel 35, having a handle 36 for operating purposes. After forming the desired number of holes in the lawn or other locality where it is desired to exterminate the weeds, the necessary solution for killing the weeds is injected into the earth in different directions from the hole, the instrument, not shown, employed for this purpose, being introduced into the holes formed by the use of my improved machine. The method of procedure would, of course, be the same whether the holes are formed by the use of the tube or the auger. Any suitable weed exterminating solution may be employed. It is, of course, necessary that it should be of such character that when applied to the roots of the weeds it will kill the latter without injuring the grass roots. It is assumed, as heretofore intimated, that the weed roots extend a considerable distance below the grass roots, and that the holes formed by my improved machine are deep enough to make it practicable to introduce the weed killing solution below the grass roots, the solution at the same time coming in contact with the roots of the weeds.

Having thus described my invention, what I claim is:

1. A machine of the class described, comprising a platform, a plate mounted above the platform, and vertically adjustable, a frame mounted above the plate, and also vertically adjustable, a vertically reciprocating earth-hole-forming tool passing through openings formed in the said plate and platform, and means mounted upon the said frame for actuating the said tool, substantially as described.

2. An earth-hole-forming machine, comprising a platform, a plate mounted above the platform, a frame mounted above the plate, a vertically disposed tube passing through openings formed in the plate and platform, a cog-rack passing through a bifurcated transverse member forming the upper portion of the frame, the said rack connected with the upper extremity of the tube, a pinion also positioned in said bifurcated member to mesh with said rack, and an operating crank-shaft, upon which the pinion is mounted.

3. A machine of the class described, comprising a wheel supported platform, a vertically adjustable framework positioned on the platform, a vertically disposed tube mounted to reciprocate through perforations of the framework, and a vertically disposed rack-bar connected with said tube by means of an offset collar engaging one end of said tube, and means for actuating said rack bar substantially as described.

In testimony whereof I affix my signature in presence of two witnesses.

JOHN PRISK.

Witnesses:
 Jessie F. Hobart,
 A. Ebert O'Brien.